(12) United States Patent
Jan et al.

(10) Patent No.: US 9,807,367 B2
(45) Date of Patent: Oct. 31, 2017

(54) LIGHT FIELD IMAGE CAPTURING APPARATUS

(71) Applicant: Metal Industries Research & Development Centre, Kaohsiung (TW)

(72) Inventors: Chia-Ming Jan, Kaohsiung (TW); Ying-Chieh Lin, Kaohsiung (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 0 days.

(21) Appl. No.: 14/979,755

(22) Filed: Dec. 28, 2015

(65) Prior Publication Data

US 2017/0150120 A1    May 25, 2017

(30) Foreign Application Priority Data

Nov. 24, 2015    (TW) .............................. 104138948 A (51) Int. Cl.
| | |
|---|---|
| *H04N 5/225* | (2006.01) |
| *H04N 5/262* | (2006.01) |
| *G06K 9/36* | (2006.01) |
| *H04N 13/02* | (2006.01) |
| *H04N 5/335* | (2011.01) |

(Continued)

(52) U.S. Cl.
CPC ......... *H04N 13/0228* (2013.01); *G02B 13/00* (2013.01); *G06T 7/0018* (2013.01); *H04N 5/2256* (2013.01); *H04N 5/335* (2013.01); *H04N 13/0246* (2013.01); *G06T 2207/10052* (2013.01)

(58) Field of Classification Search
CPC .............. H04N 13/0282; H04N 5/2254; G06T 2200/21; G06T 2207/10052; G02B 13/0015; G02B 3/0006; G02B 5/3025
USPC ....... 348/340, 239, 335; 382/284; 250/208.1
See application file for complete search history.

(56) References Cited

U.S. PATENT DOCUMENTS

| | | | |
|---|---|---|---|
| 8,831,377 B2 | 9/2014 | Pitts et al. | |
| 2010/0302396 A1* | 12/2010 | Golub ................... | G02B 5/001 348/222.1 |
| 2013/0108217 A1 | 5/2013 | Terui et al. | |

(Continued)

FOREIGN PATENT DOCUMENTS

CN    101852676 B    11/2011

*Primary Examiner* — Xi Wang
(74) *Attorney, Agent, or Firm* — Juan Carlos A Marquez; Marquez IP Law Office, PLLC (57) ABSTRACT

A light field image capturing apparatus includes: a main lens, configured to transmit light of an object environment, and including an optical axis; a beam generation unit, configured to receive the light transmitted by the main lens and generate plurality Bessel-beams, where the beam generation unit includes plurality slits or conical lenses arranged in an array manner and configured to generate the Bessel-beam respectively; a micro-lens unit, configured to receive the Bessel-beam generated by the beam generation unit, and including plurality micro-lens elements corresponding to the beam generation unit, wherein each micro-lens element is configured to determine a focus point generated after the Bessel-beam passes through each micro-lens element, and a focal length of a distance between the focus point and the micro-lens element; and a light sensing unit, including a focal plane, and configured to enable the focus point to be focused on the focal plane.

12 Claims, 5 Drawing Sheets

(51) Int. Cl.
*G06T 7/00* (2017.01)
*G02B 13/00* (2006.01)

(56) References Cited

U.S. PATENT DOCUMENTS

| | | | | |
|---|---|---|---|---|
| 2013/0161399 A1* | 6/2013 | He | ............... | G06K 7/10722 235/462.41 |
| 2014/0009659 A1* | 1/2014 | Kagaya | ............... | H04N 5/23212 348/333.02 |
| 2015/0146082 A1* | 5/2015 | Kim | ............... | H04N 5/2254 348/360 |

* cited by examiner

LIGHT FIELD IMAGE CAPTURING APPARATUS

CROSS-REFERENCE TO RELATED APPLICATION

This application claims the benefit of Taiwan Patent Application No. 104138948, filed on Nov. 24, 2015, which is hereby incorporated by reference for all purposes as if fully set forth herein.

BACKGROUND

Technical Field

The present invention relates to a light field image capturing apparatus, and in particular, to the enhancement of resolution of a light field image capturing apparatus that utilize the generation of Bessel-beam to enhance directional electric field distribution, uses proper focal lengths of micro-lenses to improve assembly permissible precision, uses geometric designed slit structures accompanied with different wavelength gains to produce circles of confusion for alignment, and obtains a relatively fine image by subsequently performing image capturing, analysis, calibration, and alignment.

Related Art

In the current light field image capturing apparatus, the technology of the light field image capturing apparatus is performed by using a single pinhole or a single micro-lens array; the image resolution is limited to the feature size of the pinhole or the micro-lens array; and the angular resolution and spatial resolution are trade-off to be effectively improved when the process feasibility is simultaneously taken into consideration.

For example, US patent reference (the U.S. Pat. No. 8,831,377 B2) discloses a light field image capturing method and apparatus, wherein a single micro-lens array is used to perform a multi-angle domain pixel information, usage of the single micro-lens array is limited due to an interference between the neighboring micro-lenses.

Further, for example, Chinese patent reference (the publication No. CN 101852676 B) discloses a method and an apparatus for measuring focal length by utilizing confocal configuration, wherein a single pinhole is mainly used to achieve super-long focal length based on a conjugate focal scanning architecture, so as to filter irrelevant spatial information, and a high-precision stepper motor is used to implement a multifocal plane precision scanning technology. However, when global scanning is performed by using the method and apparatus for multifocal differential focal length measurement, it is limited by precision and speed of the motor. The method and apparatus for multifocal differential focal length measurement cannot be used to perform quick global scanning, and cannot effectively represent advantages of resolution enhancement for light field image capturing apparatus.

Still further, for example, US patent reference (the publication No. US 20130108217 A1) discloses a micro-lens array and an optical transmission component, wherein the directional light field distribution is enhanced mainly by means of narrowing down an aperture to an optical fiber coupling apparatus. However, the performance of improving angular and spatial resolution is still trade-off.

In view of the above, it is necessary to provide a light field image capturing apparatus for effectively improving angular resolution and spatial resolution.

SUMMARY

The main objective of the present invention is to provide a light field image capturing apparatus for generating Bessel-beam to enhance directional electric field distribution by slits, and extending focal lengths of the beam by using micro-lenses, In order to achieve the above objective, the present invention provides a light field image capturing apparatus, including: a main lens, configured to transmit light of an object environment, and including an optical axis; a beam generation unit, configured to receive the light transmitted by the main lens and generate plurality Bessel-beams, wherein the beam generation unit includes plurality slits or conical lenses arranged in an array manner and configured to generate the Bessel-beams respectively, and the slits or conical lenses are arranged along a direction perpendicular to the optical axis of the main lens; a micro-lens unit, configured to receive the Bessel-beams generated by the beam generation unit, and including plurality micro-lens elements corresponding to the beam generation unit, wherein the micro-lens elements are also arranged along a direction perpendicular to the optical axis of the main lens, and each micro-lens element is configured to determine a focus point generated after the Bessel-beam passes through each micro-lens element, and a focal length of a distance between the focus point and the micro-lens element according to each focus point; and a light sensing unit, including a focal plane, and configured to enable the focus point to be focused on the focal plane.

The present invention is characterized in that the plurality slits or plurality conical lenses arranged in an array manner are used to generate the Bessel-beams, so as to enhance angular resolution and spatial resolution based on directional electric field distribution.

In addition, focal lengths of the Bessel-beams with respect to the slits can be adjusted by using the micro-lens elements, so as to extend available focal lengths, that can extend depth of field of focusing work to a millimeter level, and improve assembly permissible precision, thereby effectively improving angular resolution and spatial resolution as well as obtaining a high quality image with more complete details and more detailed depth map information.

Another objective of the present invention is to provide a light field image capturing apparatus, wherein at least one circles of confusion are generated by using slits, of which sizes are designed as diffraction level. Furthermore, the circles of confusion are calibrated by using the image capture and alignment.

In order to achieve the above objective, the light field image capturing apparatus provided in the present invention further includes an image capturing and analyzing unit, and the image capturing and analyzing unit is configured to analyze and calibrate the circles of confusion formed on the focal plane so as to adjust the alignment.

The present invention is further characterized in that: circles of confusion are generated by using slits, of which sizes are designed to be different, and the circles of confusion are calibrated by using the image capturing and analyzing unit, so that the slits of the beam generation units and the micro-lens elements of the micro-lens unit are aligned with each other, that is, the circles of confusion are adjusted to become focus points, thereby obtaining a relatively fine image.

In order to make the above and other objectives, features, and advantages of the present invention more clear, the present invention is illustrated in detail below with reference to the accompanying drawings.

DETAILED DESCRIPTION

Figure 1:
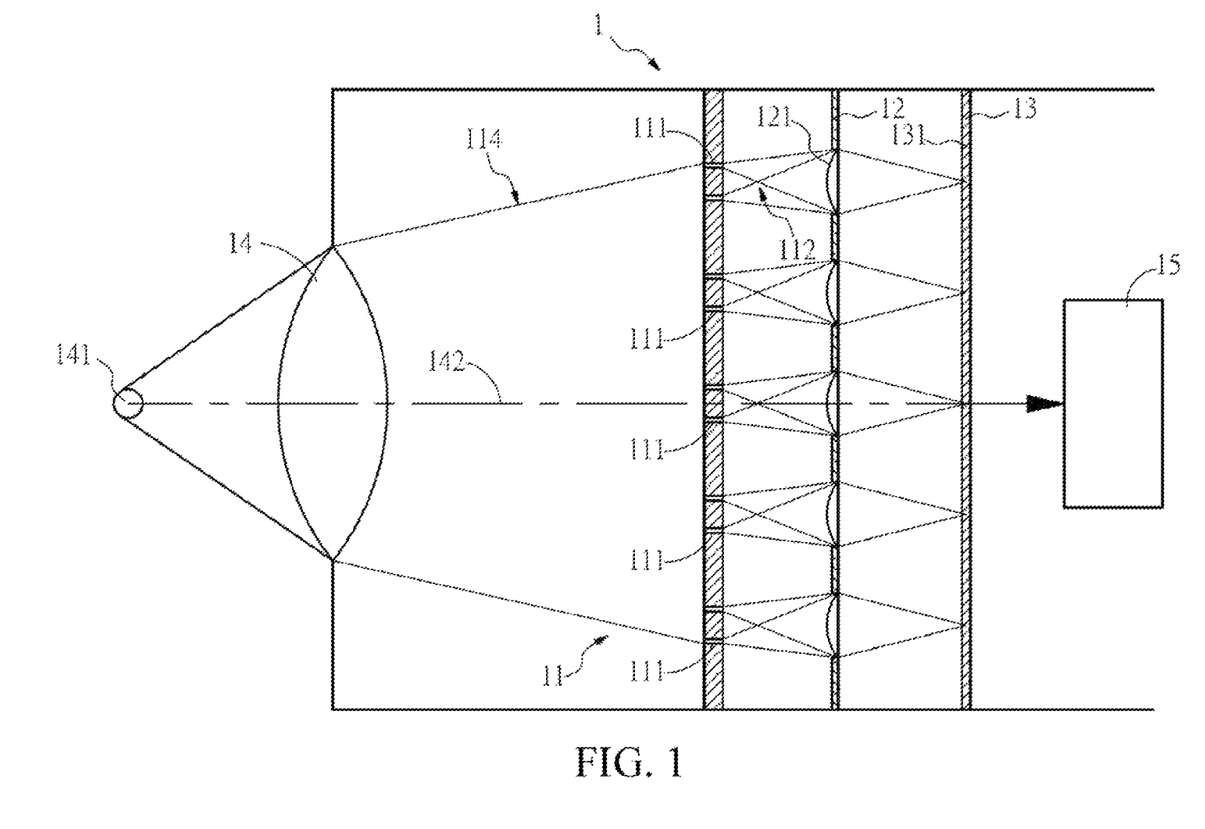
FIG. 1 is a schematic diagram of a light field image capturing apparatus according to an embodiment of the present invention.
Figure 2:
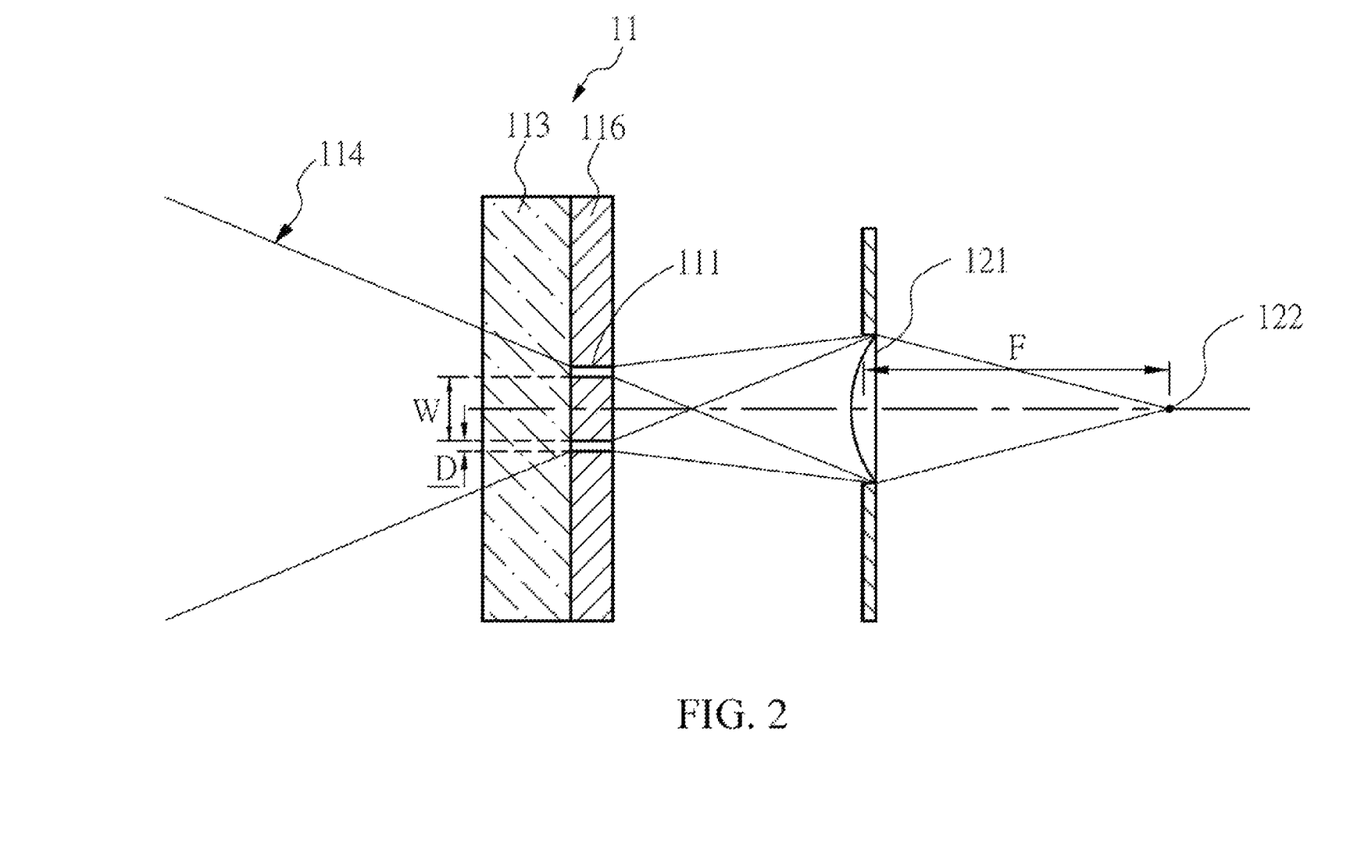
FIG. 2 is a schematic diagram of increasing an available focal length by means of controlling a micro-lens element.

FIG. 1 is a schematic diagram of a light field image capturing apparatus according to an embodiment of the present invention, and FIG. 2 is a schematic diagram of increasing an available focal length by means of controlling a micro-lens element.

Referring to FIG. 1 and FIG. 2, a light field image capturing apparatus 1 according to an embodiment of the present invention includes a main lens 14, a beam generation unit 11, a micro-lens unit 12, and a light sensing unit 13.

The main lens 14 is configured to transmit light of an object environment 141 and includes an optical axis 142.

The beam generation unit 11 is configured to receive the light transmitted by the main lens, and generate plurality Bessel-beams 112 arranged along a direction perpendicular to the optical axis of the main lens. For example, in this embodiment, the beam generation unit 11 includes plurality slits 111 arranged in an array manner, and the slits 111 are arranged along a direction perpendicular to the optical axis 142 of the main lens 14, so that a beam 114 generates Bessel-beams 112 (with high directional electric field distribution) by the slits 111 (similar to far-field interference of plurality point light sources). Using the slits 111 to generate the Bessel-beams 112 is prior art, and is not described herein again. The beam generation unit 11 of this embodiment is formed by coating, by using a sputtering machine, a clear transparent substrate 113 (such as a glass substrate) with a metal film 116 (such as a silver film) less than 250 nm, and then making, by using a focused ion beam (FIB), plurality slits 111 with inner diameter widths W between 16 μm and 50 μm and slit widths D between 150 nm and 300 nm on a surface of the metal film 116, wherein the slits 111 are annular slits or ring slits.

The micro-lens unit 12 is configured to receive the Bessel-beams 112 generated by the beam generation unit 11 and includes plurality micro-lens elements 121 arranged in an array manner, wherein the micro-lens elements 121 are also arranged along a direction perpendicular to the optical axis 142 of the main lens 14 and correspond to the slits 111 respectively. In this embodiment, by means of controlling a distance between the micro-lens element 121 and the slit 111, a position of a focus point 122 generated after the Bessel-beam 112 passes through the micro-lens element 121, and a focal length F of a distance between the focus point 122 and the micro-lens element 121 are determined, as shown in FIG. 2.

The light sensing unit 13 includes a focal plane 131. The light sensing unit 13 can be an image sensor (such as a complementary metal oxide semiconductor (CMOS) light sensing element or a charge coupled device (CCD)). The light sensing unit 13 is usually configured behind the micro-lens unit 12, and is mainly configured to focus the focus point 122 on the focal plane 131, thereby performing multi-angle domain three-dimensional scanning measurement.

The light field image capturing apparatus 1 according to this embodiment can be applied to the restoring of three-dimensional light field information (for example, being used with a 3D light field camera), wherein a beam passes through the slits 111 to generate Bessel-beam with high directional electric field distribution, thereby resolving the problem that spatial resolution cannot be improved due to a fact that a micro-lens array of the 3D light field camera may be easily subject to inter-pixel interference.

Further, focal lengths of the Bessel-beams 112 with respect to the slits 111 can be adjusted by using the micro-lens elements 121 of the micro-lens unit 12, so as to extend available focal lengths, that can extend depth of field of focusing work to a millimeter level, and improve assembly permissible precision, thereby effectively improving angular resolution and spatial resolution, obtaining a high quality image with more complete details and more detailed depth map information, and achieving means for mass production and integration of the elements.

Figure 3:
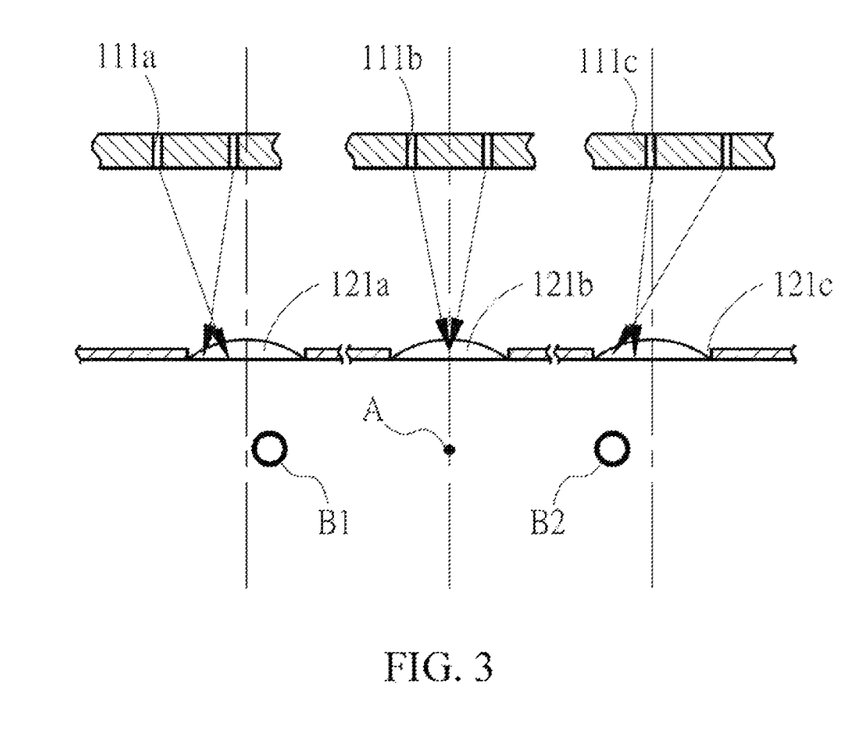
FIG. 3 is a schematic diagram of generating circles of confusion of different wavelength gains by using slits, of which sizes are designed to be different, according to an embodiment of the present invention.
Figure 4:
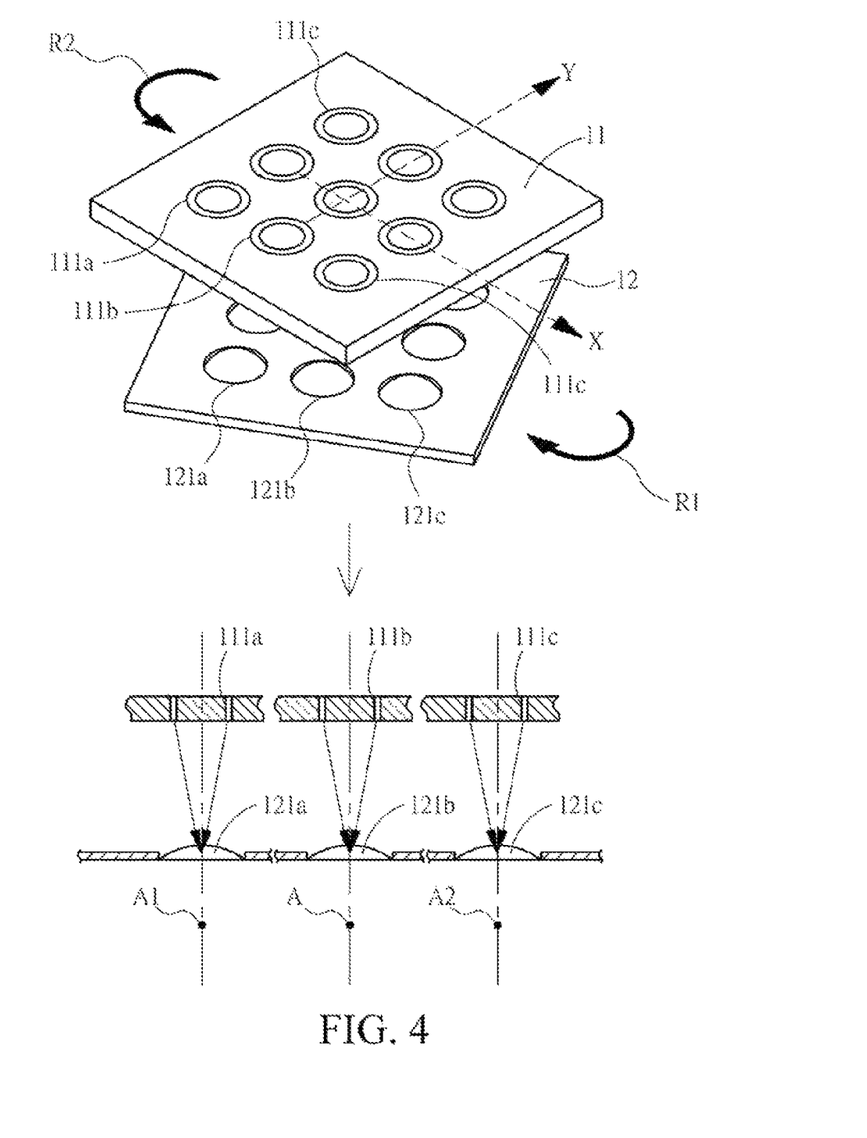
FIG. 4 is a schematic diagram of calibrating circles of confusion.

FIG. 3 is a schematic diagram of generating circles of confusion of different wavelength gains by using slits, of which sizes are designed to be different, according to an embodiment of the present invention, and FIG. 4 is a schematic diagram of calibrating circles of confusion.

Referring to FIG. 3, when slits are made, inner diameter widths and slit widths of the slits are controlled to make slits with different sizes, and the slits with different sizes can match with used light source bands. For example, slits 111a, 111b, and 111c can allow bands of three types of light, that is, red light, blue light, and green light, to pass, so that only the bands of the three types of light, that is, the red light, the blue light, and the green light can pass through the slits 111a, 111b, and 111c, and other bands are filtered. The sizes of the slits described in this embodiment can be controlled according to requirements, so as to enable required bands to pass through the slits, and the sizes of the slits can be designed according to different application fields.

In addition, the light field image capturing apparatus 1 further includes an image capturing and analyzing unit 15. Referring to FIG. 3 in combination with FIG. 1, in this embodiment, the slits 111a, 111b, and 111c, of which the sizes are designed to be different, are also used, so that a beam can generate, after the beam passes through the slits 111a, 111b, and 111c, and micro-lens elements 121a, 121b, and 121c, circles of confusion of required wavelength gains on the focal plane 131 of the light sensing unit 13. In FIG. 3, illustration is performed by using an example, wherein the slit 111b generates a focus point A, and the slits 111a and 111c generate circles of confusion B1 and B2 respectively. Accordingly, the image capturing and analyzing unit 15 arranged behind the light sensing unit 13 can be used to perform image capturing, analysis, and calibration according to the sizes and positions of the focus point A and the circles of confusion B1 and B2. Referring to FIG. 4 in combination with FIG. 3, when the image capturing, analysis, and calibration is performed, the focus point A is used as a reference point, the beam generation unit 11 or the micro-lens unit 12 is rotated by an angle along a clockwise rotation direction R1 or a counterclockwise rotation direction R2 on a plane on which an X axis intersects with a Y axis, so that the slits 111a, 111b, and 111c of the beam generation unit 11 and the micro-lens elements 121a, 121b, and 121c of the micro-lens unit 12 are aligned with each other, that is, the circles of confusion B1 and B2 are moved, and the circles of confusion B1 and B2 become smaller as focus points A1 and A2. Therefore, the circles of confusion are generated by using the slits, of which sizes are designed as diffraction level, and the circles of confusion are calibrated by using the image capturing and analyzing unit 15, thereby helpfully obtaining relatively fine image.

In this embodiment, the specific number of slits for calibrating the circles of confusion can be determined according to requirements as long as accurate positioning can be performed.

In another embodiment, in addition to rotating the beam generation unit or the micro-lens unit on a plane on which the X axis intersects with the Y axis, displacement (not shown in the drawings) in the direction of a Z axis (a direction perpendicular to the intersection of the X axis and the Y axis) also needs to be taken into consideration for calibrating circles of confusion.

Figure 5:
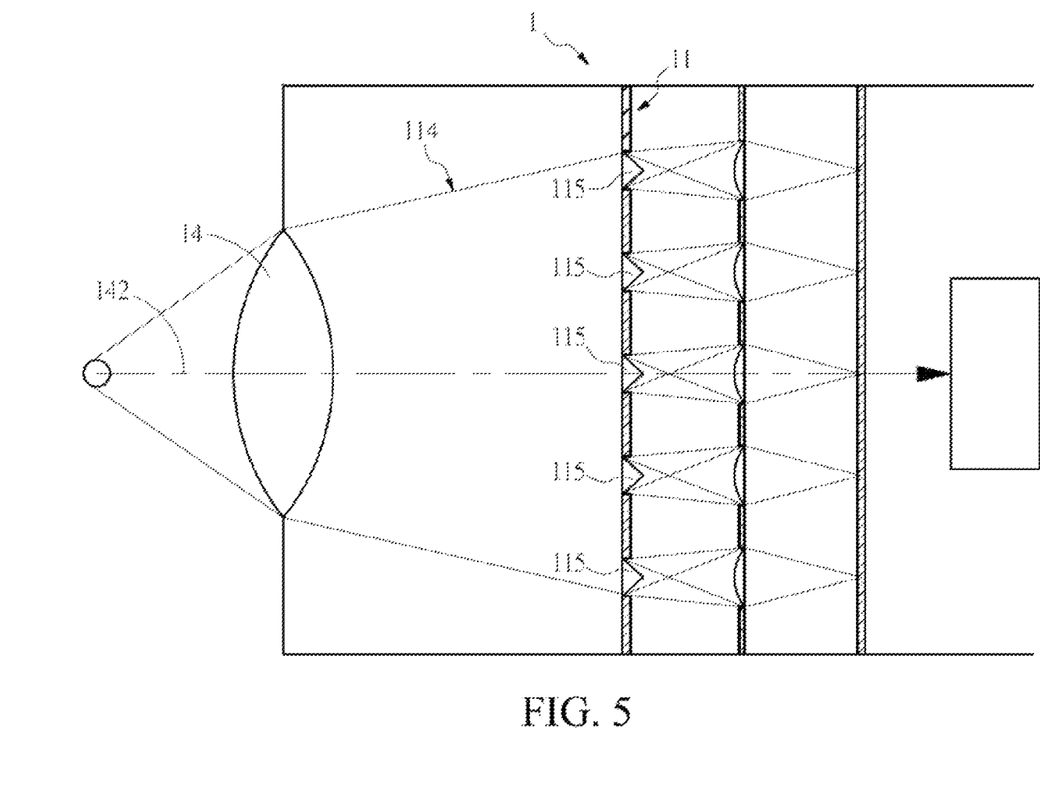
FIG. 5 is a schematic diagram of a light field image capturing apparatus according to another embodiment of the present invention.

FIG. 5 is a schematic diagram of a light field image capturing apparatus according to another embodiment of the present invention.

Referring to FIG. 5 in combination with FIG. 1, this embodiment is basically the same as the aforementioned embodiment, and this embodiment differs from the former embodiment mainly in: a beams generation unit 11 of a light field image capturing apparatus 1 includes plurality conical lenses 115 arranged in an array manner and arranged along a direction perpendicular to an optical axis 142 of a main lens 14, so that a beam 114 generates corresponding Bessel-beams after passing through the conical lenses 115.

Moreover, after the Bessel-beam with high directional electric field distribution are generated, the technology of adjusting focal lengths of the Bessel-beam with respect to the conical lenses according to the light field image capturing apparatus 1 of this embodiment are the same as those of the aforementioned embodiments, and are not described herein again.

The above descriptions are merely implementation manners or embodiments of technical means adopted by the present invention for resolving problems, but are not intended to limit the implementation scope of the present invention. That is, equivalent variations and modifications consistent with the meanings of the claims of the present invention or made according to the claims of the present invention shall fall within the scope the claims of the present invention.

What is claimed is:

1. A light field image capturing apparatus, comprising:
   a main lens, configured to transmit light of an object environment, and comprising an optical axis;
   a beam generation unit, configured to receive the light transmitted by the main lens and generate plurality Bessel-beams, wherein the beam generation unit comprises plurality slits arranged in an array manner and configured to generate the Bessel-beams respectively, and the slits are arranged along a direction perpendicular to the optical axis of the main lens;
   a micro-lens unit, configured to receive the Bessel-beams generated by the beam generation unit, and comprising plurality micro-lens elements corresponding to the beam generation unit, wherein the micro-lens elements are also arranged along a direction perpendicular to the optical axis of the main lens, and each micro-lens element is configured to determine a focus point generated after the Bessel-beam passes through each micro-lens element, and a focal length of a distance between the focus point and the micro-lens element according to each focus point; and
   a light sensing unit, comprising a focal plane, and configured to enable the focus point to be focused on the focal plane;
   wherein:
   the slits enable a beam to generate, after the beam passes through the slits, corresponding Bessel-beams respectively; and
   the micro-lens elements are arranged in an array manner and correspond to the slits respectively.

2. The light field image capturing apparatus according to claim 1, wherein the slits are completed by forming a metal film on a transparent substrate and then making the slits on a metal surface of the metal film.

3. The light field image capturing apparatus according to claim 2, wherein the slits are annular slits.

4. The light field image capturing apparatus according to claim 3, wherein an inner diameter width of each of the slits is between 16 μm and 50 μm, and a slit width of each of the slits is between 150 nm and 300 nm.

5. The light field image capturing apparatus according to claim 1, further comprising: an image capturing and analyzing unit, configured to analyze and calibrate at least one circle of confusion formed on the focal plane.

6. The light field image capturing apparatus according to claim 5, wherein circles of confusion of different wavelength gains generated, by the Bessel-beams of different wavelengths generated by the slits of different sizes, on the focal plane of the light sensing unit after the Bessel-beams pass through the corresponding micro-lens elements.

7. The light field image capturing apparatus according to claim 1, wherein the light sensing unit is an image sensor.

8. The light field image capturing apparatus according to claim 7, wherein the image sensor is a complementary metal oxide semiconductor (CMOS) photosensitive element or a charge coupled device (CCD).

9. A light field image capturing apparatus, comprising:
   a main lens, configured to transmit light of an object environment, and comprising an optical axis;
   a beam generation unit, configured to receive the light transmitted by the main lens and generate plurality Bessel-beams, wherein the beam generation unit comprises plurality slits arranged in an array manner and configured to generate the Bessel-beams respectively, and the slits are arranged along a direction perpendicular to the optical axis of the main lens;
   a micro-lens unit, configured to receive the Bessel-beams generated by the beam generation unit, and comprising plurality micro-lens elements corresponding to the beam generation unit, wherein the micro-lens elements are also arranged along a direction perpendicular to the optical axis of the main lens, and each micro-lens element is configured to determine a focus point generated after the Bessel-beam passes through each micro-lens element, and a focal length of a distance between the focus point and the micro-lens element according to each focus point; and
   a light sensing unit, comprising a focal plane, and configured to enable the focus point to be focused on the focal plane;
   wherein the slits are completed by forming a metal film on a transparent substrate and then making the slits on a metal surface of the metal film.

10. The light field image capturing apparatus according to claim 9, wherein the slits are annular slits.

11. The light field image capturing apparatus according to claim 10, wherein an inner diameter width of each of the slits is between 16 µm and 50 µm, and a slit width of each of the slits is between 150 nm and 300 nm.

12. A light field image capturing apparatus, comprising:
a main lens, configured to transmit light of an object environment, and comprising an optical axis; a beam generation unit, configured to receive the light transmitted by the main lens and generate plurality Bessel-beams, wherein the beam generation unit comprises plurality slits arranged in an array manner and configured to generate the Bessel-beams respectively, and the slits are arranged along a direction perpendicular to the optical axis of the main lens;
a micro-lens unit, configured to receive the Bessel-beams generated by the beam generation unit, and comprising plurality micro-lens elements corresponding to the beam generation unit, wherein the micro-lens elements are also arranged along a direction perpendicular to the optical axis of the main lens, and each micro-lens element is configured to determine a focus point generated after the Bessel-beam passes through each micro-lens element, and a focal length of a distance between the focus point and the micro-lens element according to each focus point;
a light sensing unit, comprising a focal plane, and configured to enable the focus point to be focused on the focal plane; and
an image capturing and analyzing unit, configured to analyze and calibrate at least one circle of confusion formed on the focal plane;
wherein circles of confusion of different wavelength gains generated, by the Bessel-beams of different wavelengths generated by the slits of different sizes, on the focal plane of the light sensing unit after the Bessel-beams pass through the corresponding micro-lens elements.

* * * * *